(12) United States Patent
Kim et al.

(10) Patent No.: US 11,688,901 B2
(45) Date of Patent: Jun. 27, 2023

(54) CELL-CASE UNIT AND BATTERY MODULE INCLUDING THE SAME

(71) Applicant: SK On Co., Ltd., Seoul (KR)

(72) Inventors: Suk Chul Kim, Daejeon (KR); Yong Uk Kim, Daejeon (KR); Jong Ho Seok, Daejeon (KR)

(73) Assignee: SK On Co., Ltd., Seoul (KR)

( * ) Notice: Subject to any disclaimer, the term of this patent is extended or adjusted under 35 U.S.C. 154(b) by 187 days.

(21) Appl. No.: 17/110,405

(22) Filed: Dec. 3, 2020

(65) Prior Publication Data

US 2021/0175571 A1    Jun. 10, 2021

(30) Foreign Application Priority Data

Dec. 4, 2019  (KR) ................. 10-2019-0159871

(51) Int. Cl.
| | |
|---|---|
| *H01M 10/6554* | (2014.01) |
| *H01M 50/209* | (2021.01) |
| *H01M 50/211* | (2021.01) |
| *H01M 50/244* | (2021.01) |
| *H01M 50/264* | (2021.01) |
| *H01M 50/291* | (2021.01) |
| *H01M 10/613* | (2014.01) |
| *H01M 10/647* | (2014.01) |
| *H01M 10/6562* | (2014.01) |

(Continued)

(52) U.S. Cl.
CPC ..... *H01M 10/6554* (2015.04); *H01M 10/613* (2015.04); *H01M 10/647* (2015.04); *H01M 10/6555* (2015.04); *H01M 10/6562* (2015.04); *H01M 50/209* (2021.01); *H01M 50/211* (2021.01); *H01M 50/238* (2021.01); *H01M 50/244* (2021.01); *H01M 50/264* (2021.01); *H01M 50/291* (2021.01)

(58) Field of Classification Search
None
See application file for complete search history.

(56) References Cited

U.S. PATENT DOCUMENTS

| | | |
|---|---|---|
| 2011/0033734 A1 | 2/2011 | Chamberlain, II et al. |
| 2011/0183176 A1* | 7/2011 | Schwab ............. H01M 10/613 |
| | | 29/623.2 |

(Continued)

FOREIGN PATENT DOCUMENTS

| | | |
|---|---|---|
| CN | 209641785 U | 11/2019 |
| JP | 2010049842 A * | 3/2010 |

(Continued)

OTHER PUBLICATIONS www.espacenet.com machine translation of JP 2012119232A. (Year: 2012).*

*Primary Examiner* — Gregg Cantelmo
(74) *Attorney, Agent, or Firm* — The Webb Law Firm

(57) ABSTRACT

A cell case unit includes a cell support member including at least one or more secondary battery cells, at least one seating portion in which the secondary battery cells are accommodated; and a case member covering the secondary battery cells accommodated in the seating portion, having a portion adjacent to both ends of the secondary battery cells to be coupled to the cell support member, and including a stretchable portion configured to be stretched in at least a portion of the case member.

11 Claims, 5 Drawing Sheets

(51) Int. Cl.
*H01M 10/6555* (2014.01)
*H01M 50/238* (2021.01)

(56) References Cited

U.S. PATENT DOCUMENTS

| | | | |
|---|---|---|---|
| 2011/0244297 A1* | 10/2011 | Kruger | H01M 10/625 |
| | | | 429/120 |
| 2012/0286706 A1 | 11/2012 | Ohkura | |
| 2013/0157099 A1* | 6/2013 | Anderson | H01M 50/276 |
| | | | 429/120 |
| 2015/0147605 A1 | 5/2015 | Kim et al. | |
| 2016/0028050 A1* | 1/2016 | Shiraishi | H01M 50/209 |
| | | | 429/57 |
| 2017/0141371 A1 | 5/2017 | Toshioka et al. | |
| 2017/0294638 A1* | 10/2017 | Joo | H01M 50/414 |
| 2020/0274211 A1 | 8/2020 | Li et al. | |
| 2021/0013478 A1 | 1/2021 | Sasaki et al. | |

FOREIGN PATENT DOCUMENTS

| | | | |
|---|---|---|---|
| JP | 2012119232 A * | 6/2012 | |
| KR | 1020150061200 A | 6/2015 | |
| KR | 20170014309 A | 2/2017 | |
| WO | 2019181501 A1 | 9/2019 | |

* cited by examiner

CELL-CASE UNIT AND BATTERY MODULE INCLUDING THE SAME

CROSS-REFERENCE TO RELATED APPLICATION(S)

This application claims priority to Korean Patent Application No. 10-2019-0159871 filed Dec. 4, 2019, the disclosure of which is hereby incorporated by reference in its entirety.

BACKGROUND OF THE INVENTION

Field of the Invention

Example embodiments of the present disclosure relate to a cell-case unit and a battery module including the same.

Description of Related Art

As technological development and demand for mobile devices, electric vehicles, energy storage systems (ESS), and the like, have increased, the demand for a secondary battery cell as an energy source has been rapidly increased. A secondary battery cell may be charged and discharged repeatedly as mutual conversion between chemical energy and electrical energy is reversible.

Such a secondary battery cell may include an electrode assembly such as a positive electrode, a negative electrode, a separator, and an electrolyte, which are major components of a secondary battery, and a cell body member of a laminated film case protecting the electrode assembly.

Such an electrode assembly may generate heat while going through the process of charging and discharging, and a temperature increase due to such heat generation may degrade performance of the secondary battery cell.

Also, when the heat generation becomes severe, internal pressure of the secondary battery cell may increase such that the secondary battery cell may be ignited.

Also, when a plurality of secondary battery cells are mounted as in an energy storage system (ESS), a secondary battery cell may explode, along with the above-described ignition, and the flame may propagate to the neighboring secondary battery cells.

In the case of a pouch-type secondary battery in which the cell body member is three-side bonded, a lower surface portion may be configured to be in contact with a cooling plate member to externally discharge heat generated from the secondary battery cell, and the cooling plate member may be connected to a heat sink and may discharge heat.

A general cooling plate has been used as a component only for discharging heat of a secondary battery cell, and a general cooling plate has not prevented the issue in which flame generated in the secondary battery cell propagates to an adjacent secondary battery cell.

Therefore, to improve the above-described problems or limitations, a research in a cell case unit and a battery module including the same has been necessary.

SUMMARY OF THE INVENTION

An example embodiment of the present disclosure is to provide a cell-case unit and a battery module including the same.

Another example embodiment of the present disclosure is to provide a cell case unit which may prevent explosion of a secondary battery cell caused by swelling of a secondary battery cell when the secondary battery cell swells, and a battery module including the same.

According to an example embodiment of the present disclosure, a cell case unit includes a plurality of secondary battery cells, a cell support member including at least one seating portion in which the secondary battery cells are accommodated; and a case member covering the secondary battery cells accommodated in the seating portion, having a portion adjacent to both ends of the secondary battery cells to be coupled to the cell support member, and including a stretchable portion configured to be stretched in at least a portion of the case member.

The case member of the cell case unit may include an end plate portion enclosing one end of the cell support member and a side plate portion enclosing the secondary battery cells accommodated in the seating portion, having one end connected to the end plate portion and the other end coupled to the cell support member.

The side plate portion of the cell case unit may include the stretchable portion on at least one of the one end connected to the end plate portion and the other end coupled to the case member.

The stretchable portion of the cell case unit may have a bellows shape.

One end of the case member of the cell case unit may be closed and the other end may be open such that the case member may be inserted into and coupled to an upper portion and a lower portion of the cell support member in which the secondary battery cells are accommodated.

The case member of the cell case unit may be formed of iron (Fe) having a thickness of at least 0.65 mm, or may be formed of aluminum (Al) having a thickness of 1.0 mm.

The cell support member of the cell case unit may be formed to have a shape corresponding to the shape of the stretchable portion of the case member formed in a zigzag pattern and may be coupled to the case member.

The cell support member of the cell case unit may be include a cell gap forming portion coupled to the seating portion and forming a gap between the seating portion and the secondary battery cells.

The cell gap forming portion of the cell case unit may include a second protrusion tap forming a columnar shape together with a first protruding tab formed in the seating portion and forms a space around the first protruding tab and the second protruding tab.

The cell gap forming portion of the cell case unit may form a gap of at least 2 mm between the seating portion and the secondary battery cells.

According to another example embodiment of the present disclosure, a battery module includes a cell case unit and a body frame member in which a plurality of the cell case units are installed.

The body frame member of the battery module may include a case gap forming portion disposed between the cell case units adjacent to each other and forming a gap therebetween.

BRIEF DESCRIPTION OF THE DRAWINGS

The above and other aspects, features, and advantages of the present disclosure will be more clearly understood from the following detailed description, taken in conjunction with the accompanying drawings, in which.

DESCRIPTION OF THE INVENTION

Figure 1:
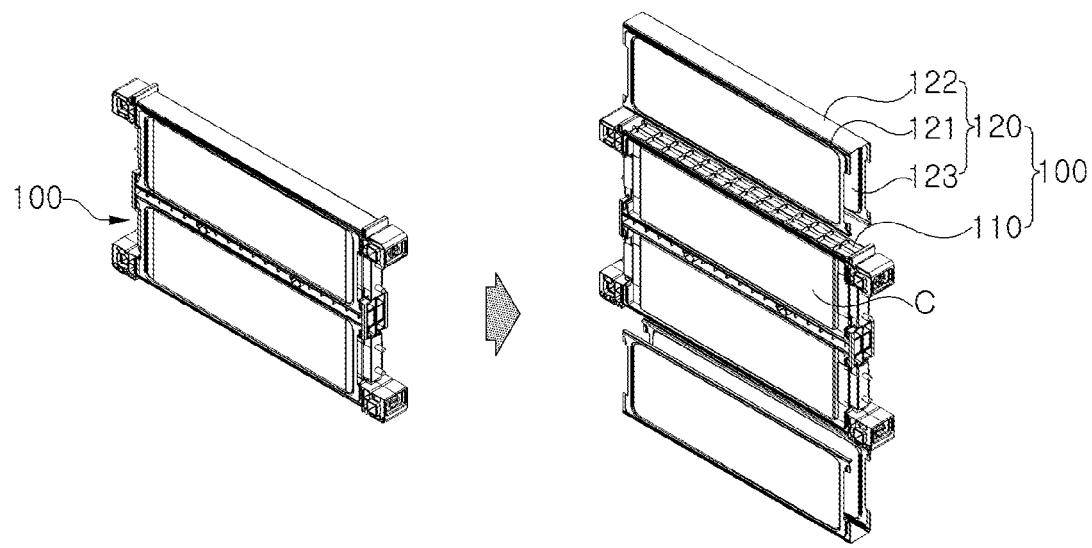
FIG. 1 is a perspective diagram illustrating a cell case unit according to an example embodiment of the present disclosure.

Hereinafter, embodiments of the present disclosure will be described as follows with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

The terms used in the following description are provided to explain a specific exemplary embodiment and are not intended to be limiting. A singular term includes a plural form unless otherwise indicated. The terms, "include," "comprise," "is configured to," etc. of the description are used to indicate the presence of features, numbers, steps, operations, elements, parts or combination thereof, and may not exclude the possibilities of combination or addition of one or more features, numbers, steps, operations, elements, parts or combination thereof.

An example embodiment relates to a cell case unit 100 and a battery module including the same, which may prevent propagation of ignition of the secondary battery cell C.

In addition to the prevention of propagation of flame, leakage of an electrolyte in the secondary battery cell C may be prevented or leakage of the electrolyte may be reduced.

Also, an increase in flame may be prevented by reducing air in the secondary battery cell C in which flame is generated, and the flame may be induced only in the direction of an electrode tab of the secondary battery cell C such that the possibility of spreading of fire may be reduced.

Also, the cell case unit 100 and the battery module including the same in the example embodiment may prevent explosion of the secondary battery cell C caused by the swelling of the secondary battery cell C.

To prevent the propagation of flame, in a state in which a plate material is provided around the secondary battery cell C, when the swelling phenomenon in which the secondary battery cell C is expanded due to internal heat generated in the secondary battery cell C occurs, the plate material may exert pressure on an external side of the secondary battery cell C such that the force to pressurize the secondary battery cell C may also increase by the reaction.

Accordingly, explosion of the secondary battery cell C may occur, and the example embodiment may address the issue.

Further, the cell case unit 100 and the battery module including the same in the example embodiment may address the issue in which, when a plurality of secondary battery cells C are mounted as in an energy storage system (ESS), the issue in which explosion of one of the secondary battery cells C is propagated to the other secondary battery cells C and the secondary battery cells are exploded in series may be addressed.

Figure 2:
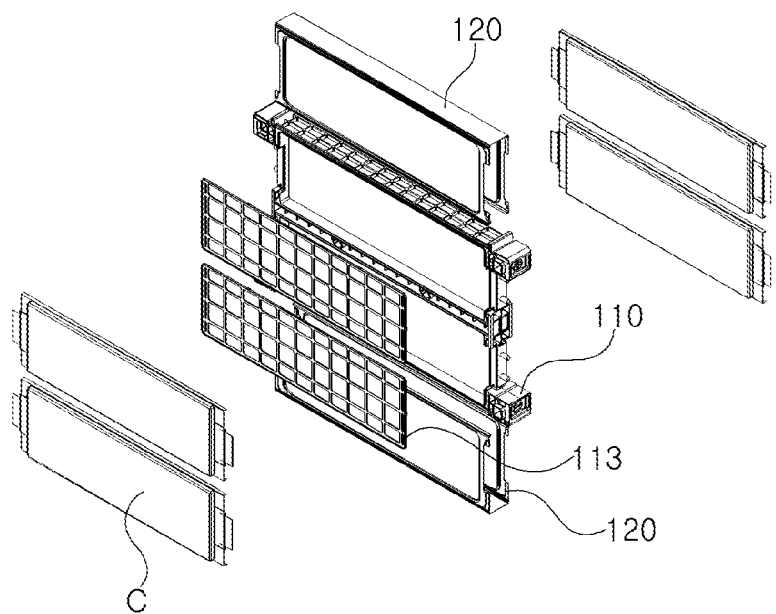
FIG. 2 is a cross-sectional diagram illustrating a state in which a secondary battery cell is separated from a cell case unit according to an example embodiment of the present disclosure.

Referring to the drawings, FIG. 1 is a perspective diagram illustrating a cell case unit according to an example embodiment, and FIG. 2 is a cross-sectional diagram illustrating a state in which a secondary battery cell is separated from a cell case unit according to an example embodiment. Referring to FIGS. 1 and 2, the cell case unit 100 in the example embodiment may include a plurality of secondary battery cells C, a cell support member 110 including at least one seating portion 111 in which the secondary battery cells C is accommodated, and a case member 120 covering the secondary battery cells C accommodated in the seating portion 111, having a portion adjacent to both end portions of the secondary battery cells C to be coupled to the cell support member 110, and including a stretchable portion 121 configured to be stretched in at least a portion of the case member 120.

As the cell case unit 100 in the example embodiment is provided with the case member 120 which may cover the secondary battery cells C, propagation of ignition of the secondary battery cells C may be prevented.

Also, as the case member 120 is partially stretchable, the case member 120 may be stretched without pressurizing the secondary battery cell C when the secondary battery cell C swells, such that the issue in which the secondary battery cell C is pressured and exploded may be prevented.

To this end, the secondary battery cell C may be accommodated in the cell support member 110, and the case member 120 including the stretchable portion may be coupled to the cell support member 110 in which the secondary battery cell C is accommodated and may enclose the secondary battery cell C.

The cell support member 110 may include a seating portion 111 to accommodate the secondary battery cell C. Also, the cell support member 110 may include a coupling portion 112 configured to have a shape corresponding to the case member 120 so as to be coupled to the case member 120, and may further include a cell gap forming portion 113 forming a gap t2 between the secondary battery cells C neighboring to each other, accommodated in the seating portion 111. The configuration will be described in greater detail with reference to FIG. 3.

The case member 120 may be coupled to the cell support member 110 and may be provided to cover the secondary battery cell C such that, even when the secondary battery cell C ignites, the flame may be prevented from spreading externally.

To this end, the case member 120 may include an end plate portion 122 and a side plate portion 123, which will be described in greater detail with reference to FIG. 3.

A shape of the case member 120 may have one end configured to be closed and the other end configured to be open. The case member 120 configured as above may be inserted into and coupled to the cell support member 110 on which the secondary battery cell C is seated.

Accordingly, the case member 120 of the cell case unit 100 in the example embodiment may have one end configured to be closed and the other end configured to be open such that the case member 120 may be inserted into and coupled to an upper portion and a lower portion of the cell support member 110 in which the secondary battery cells C is accommodated.

The case member 120 may have one end configured to be closed and the other end configured to be open such that the case member 120 may have a "⊏" shape.

Accordingly, the case member 120 may enclose the secondary battery cell C seated on the cell support member 110 such that flame in the secondary battery cell C may be prevented from spreading externally.

Also, the cell support member 110 may include the secondary battery cell C on an upper end and a lower end thereof, and the secondary battery cell C may be accommodated on both surfaces of the upper end and the lower end. Also, the "⊏" shaped case member 120 may be coupled to the upper end and the lower end of the cell support member 110 and may enclose the secondary battery cell C.

The case member 120 may be formed of a metal material, such that flame from the secondary battery cell C may be prevented from being spread.

For example, the case member 120 of the cell case unit 100 in the example embodiment may be formed of iron (Fe) having a thickness t1 of at least 0.65 mm, or aluminum (Al) having a thickness of at least 1.0 mm.

The material and the thickness t1 of the case member 120 may be limited as above because the material and the thickness t1 may resist against the flame of the secondary battery cell C and material use may be reduced.

TABLE 1

| Material | Aluminum | | Iron | |
| --- | --- | --- | --- | --- |
| Thickness (mm) | 0.5 | 1.0 | 0.65 | 1.0 |
| Whether case member is broken | ○ | X | X | X |
| Maximum temperature of ignited secondary battery cell (° C.) | 1360 | 760 | 1360 | 1360 |
| Maximum temperature of neighboring secondary battery cell (° C.) | 790 | 120 | 160 | 160 |
| Whether fire has been spread | ○ | X | X | X |

As indicated in Table 1 above, the fire was not spread in the experiment in which the case member 120 was formed of iron with the thickness t1 of at least 0.65 mm, or the case member 120 was formed of aluminum with the thickness t1 of at least 1.0 mm, and thus, the above-mentioned materials and thickness t1 may be effective.

Figure 3:
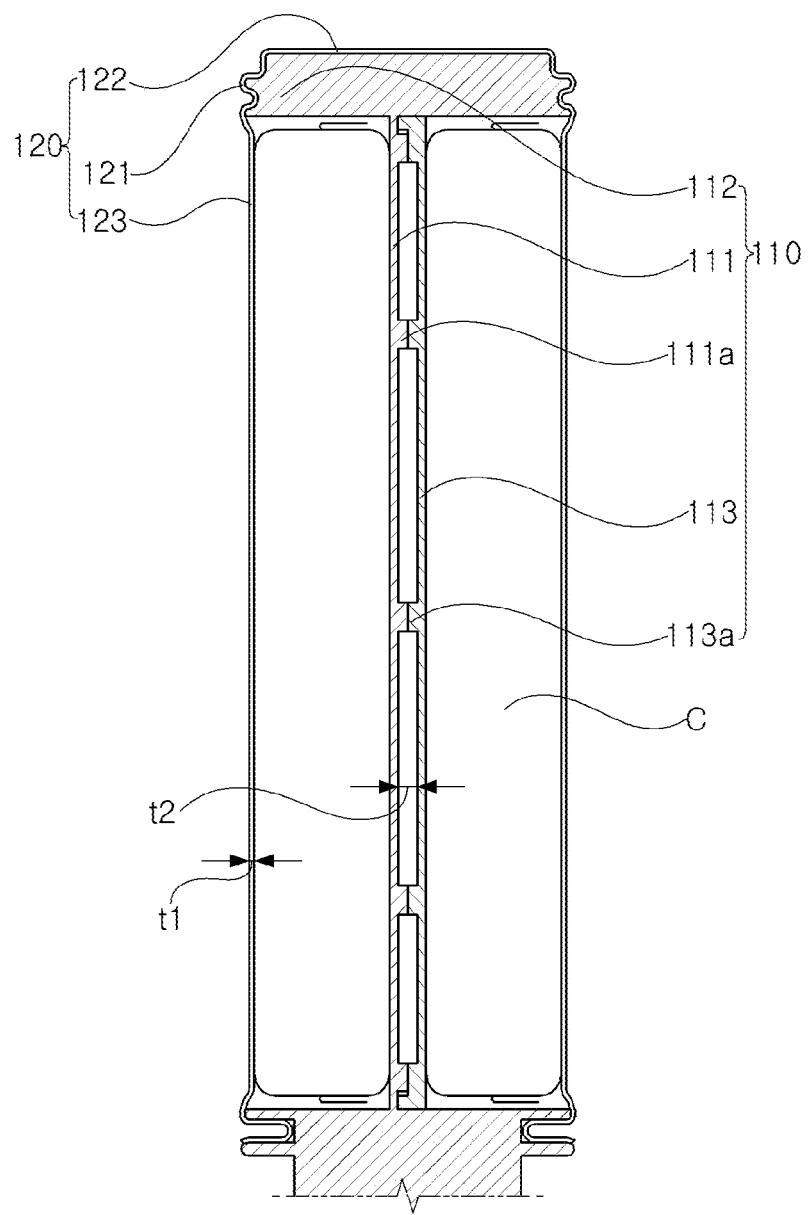
FIG. 3 is a cross-sectional diagram illustrating a cell case unit according to an example embodiment of the present disclosure.

FIG. 3 is a cross-sectional diagram illustrating a cell case unit according to an example embodiment. Referring to FIG. 3, the case member 120 of the cell case unit 100 in the example embodiment may include an end plate portion 122 surrounding one end of the cell support member 110 and a side plate portion 123 enclosing the secondary battery cells C accommodated in the seating portion 111, and having one end connected to the endplate portion 122 and the other end coupled to the cell support member 110.

As the case member 120 includes the end plate portion 122 and the side plate portion 123, the case member 120 may be configured to cover the secondary battery cell C. Accordingly, even when the secondary battery cell C flames, the frame may be prevented from spreading externally.

To this end, the end plate portion 122 may be disposed on one end of the cell support member 110, and the side plate portion 123 coupled to both ends of the end plate portion 122 may be disposed to enclose the secondary battery cell C accommodated in the seating portion 111.

Also, the stretchable portion 121 may be provided in the side plate portion 123 such that, even when the secondary battery cell C swells, the secondary battery cell C may not be pressured.

Accordingly, the side plate portion 123 of the cell case unit 100 in the example embodiment may include the stretchable portion 121 on at least one of one end connected to the end plate portion 122 and the other end coupled to the case member 120.

In other words, the side plate portion 123 may have one end connected to the end plate portion 122 and the other end connected to the cell support member 110, and by including the stretchable portion 121, even when the secondary battery cell C swells, the stretchable portion 121 may expand such that the swelling deformation may be accommodated therein.

As an example, the stretchable portion 121 of the cell case unit 100 in the example embodiment may be configured to have a bellows shape.

By having a bellows shape, when the secondary battery cell C swells, a bent portion of the stretchable portion 121 may be unfolded and may accommodate the deformation of the secondary battery cell C. Also, this deformation may be accommodated in the elastic region according to a material of the case member 120, and the swelling of the secondary battery cell C may be pressurized such that the swelling of the secondary battery cell C may be prevented to some extent.

The cell support member 110 of the cell case unit 100 in the example embodiment may include a coupling portion 112 having a shape corresponding to the shape of the stretchable portion 121 of the case member 120 recessed in a zigzag pattern, and coupled to the case member 120.

As an example, the stretchable portion 121 may have an "S"-shaped cross-sectional shape, and the cell support member 110 may have an "S" shape corresponding to the cross-sectional shape of the stretchable portion 121.

Accordingly, as the cell support member 110 is formed to correspond to the shape of the stretchable portion 121, in a normal state in which the secondary battery cell C does not swell, the stretchable portion 121 may be inserted into the coupling portion 112 and may be maintained to be coupled thereto. When the secondary battery cell C swells, the stretchable portion 121 may be stretched beyond the coupling portion 112 and may accommodate the swelling deformation of the secondary battery cell C.

Also, when the "S"-shaped stretchable portion 121 is formed on the lower end of the case member 120, the coupling portion 112 may also be disposed on the lower end of the secondary battery cell C. In this case, even when a body member of the secondary battery cell C is damaged and an electrolyte solution therein is leaked, the electrolyte solution may be received in a region between the case member 120 and the cell support member 110. Accordingly, the leakage of the electrolyte solution in the case member 120 may be prevented or may be reduced.

In other words, the coupling portion 112 of the cell support member 110 may be inserted into and coupled to the stretchable portion 121 of the case member 120, and for the electrolyte solution to flow out to a lower portion, the electrolyte solution may pass through an "S"-shaped flow path formed by the stretchable portion 121 and the coupling portion 112. In this case, a flow path may increase as compared to the example in which the elements are coupled to each other in a linear shape, and as the electrolyte solution needs to pass through a curved flow path, it may be difficult for the electrolyte solution to flow out. Accordingly, the electrolyte solution may be prevented from flowing out or the leakage of the electrolyte solution may be reduced.

Also, the cell support member 110 of the cell case unit 100 in the example embodiment may include a cell gap forming portion 113 coupled to the seating portion 111, and forming the gap t2 between the seating portion 111 and the secondary battery cell C.

By forming the gap t2 between the secondary battery cells C by the cell gap forming portion 113, the propagation of heat to the neighboring secondary battery cells C may be prevented. Thus, by reducing the transference of heat in addition to the spread of flame, explosion of the neighboring secondary battery cells C may be prevented.

The portion in which the cell gap forming portion 113 is provided may be the seating portion 111 of the cell support member 110. In other words, in the cell support member 110, the seating portions 111 may be formed on both side surfaces thereof, and the secondary battery cells C may be seated on both side surfaces, and as the cell gap forming portion 113 is coupled to at least one of the seating portions 111, the gap t2 may be formed between the secondary battery cells C on both sides, accommodated in the cell support member 110.

The cell gap forming portion 113 of the cell case unit 100 in the example embodiment may have a second protrusion tap forming a columnar shape together with a first protruding tab 111a such that a space may be formed around the first protruding tab 111a and the second protruding tab 113a.

The shape of the cell gap forming portion 113 may be configured to have the shape of the cell gap forming portion 113 described in the example embodiment as long as the cell gap forming portion 113 is able to form the gap t2 between the seating portion 111 and the secondary battery cell C, and the shape in which the second protruding tab 113a corresponding to the first protruding tab 111a is formed may be one example thereof.

The first protruding tab 111a formed on the seating portion 111 and the second protruding tab 113a formed on the cell gap forming portion 113 are in contact with each other to face each other, thereby forming a columnar shape. Accordingly, the gap t2 may be formed by the cell gap forming portion 113.

The cell gap forming portion 113 of the cell case unit 100 in the example embodiment may form at least 2 mm gap t2 between the seating portion 111 and the secondary battery cells C.

The gap t2 formed by the cell gap forming portion 113 may be limited as above to increase the prevention of heat transference between the neighboring secondary battery cells C and to increase spatial efficiency by reducing the gap t2.

TABLE 2

| Temperature of heat-generating secondary battery cell (° C.) | Temperature of neighboring secondary battery cells according to gap (° C.) | | |
| --- | --- | --- | --- |
| | Air gap 2 mm | Air gap 3 mm | Air gap 5 mm |
| 60 | 30.9 | 30.1 | 25.6 |
| 80 | 37.0 | 37.0 | 26.9 |
| 100 | 53.9 | 45.5 | 29.6 |
| 120 | 64.9 | 62.3 | 41.5 |
| 140 | — | 68.0 | 49.5 |

As indicated in Table 2, even when the gap t2 formed by the cell gap forming portion 113 is larger than 2 mm, the temperature change of the neighboring secondary battery cell C may not be large as compared to the example in which the gap t2 is 2 mm. Therefore, by configuring the gap t2 to be 2 mm as a minimum thereof, the same heat prevention effect may be obtained, and thus, the gap t2 formed by the cell gap forming portion 113 may be configured to be at least 2 mm.

Figure 4:
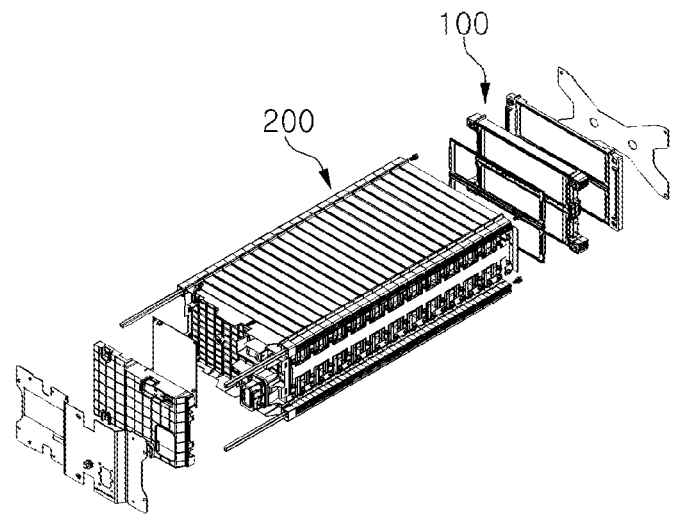
FIG. 4 is a cross-sectional diagram illustrating a battery module including a cell case unit according to an example embodiment of the present disclosure.

FIG. 4 is a cross-sectional diagram illustrating a battery module including a cell case unit according to an example embodiment. Referring to FIG. 4, a battery module according to another example embodiment may include a cell case unit 100 in which at least one secondary battery cell C is accommodated and a body frame member 200 in which the plurality of cell case units 100 are installed As the battery module in the example embodiment includes the cell case unit 100, propagation of ignition of the secondary battery cells C may be prevented, and also, when the secondary battery cells C swells, explosion of the secondary battery cells C caused by the swelling may be prevented.

Also, the battery module in the example embodiment may form the gap t2 between the secondary battery cells C to prevent the propagation of heat and may also form the gap t2 between the cell case units 100 to prevent propagation of heat between the cell case units 100. This configuration will be described in greater detail with reference to FIGS. 5 to 8.

The body frame member 200 may have a box shape in which the plurality of cell case units 100 are accommodated, or may have a bar-shaped frame in which the plurality of the cell case units 100 are connected to and tied to each other.

Figure 5:
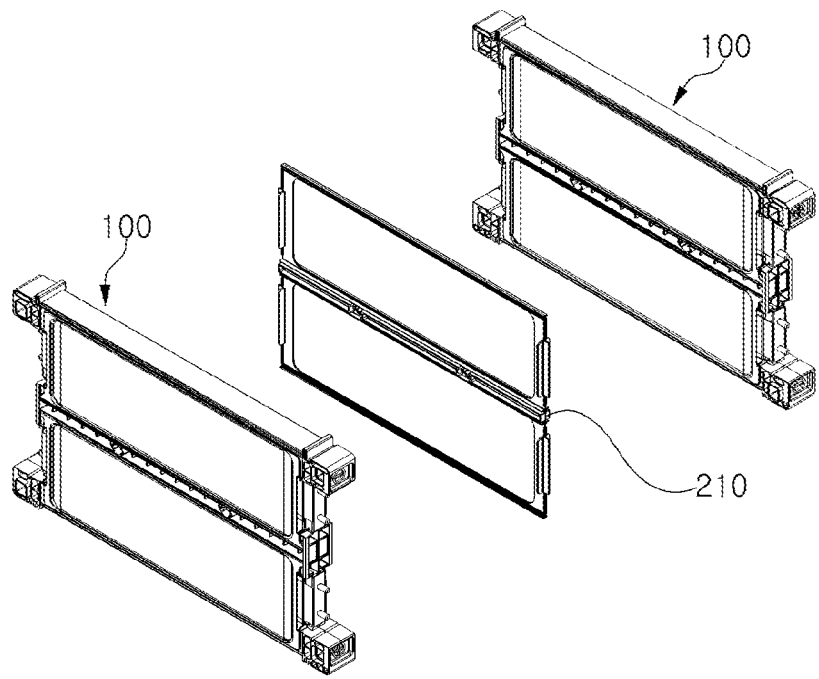
FIG. 5 is a perspective diagram illustrating an example embodiment of a battery module including a case gap forming portion according to an example embodiment of the present disclosure.
Figure 6:
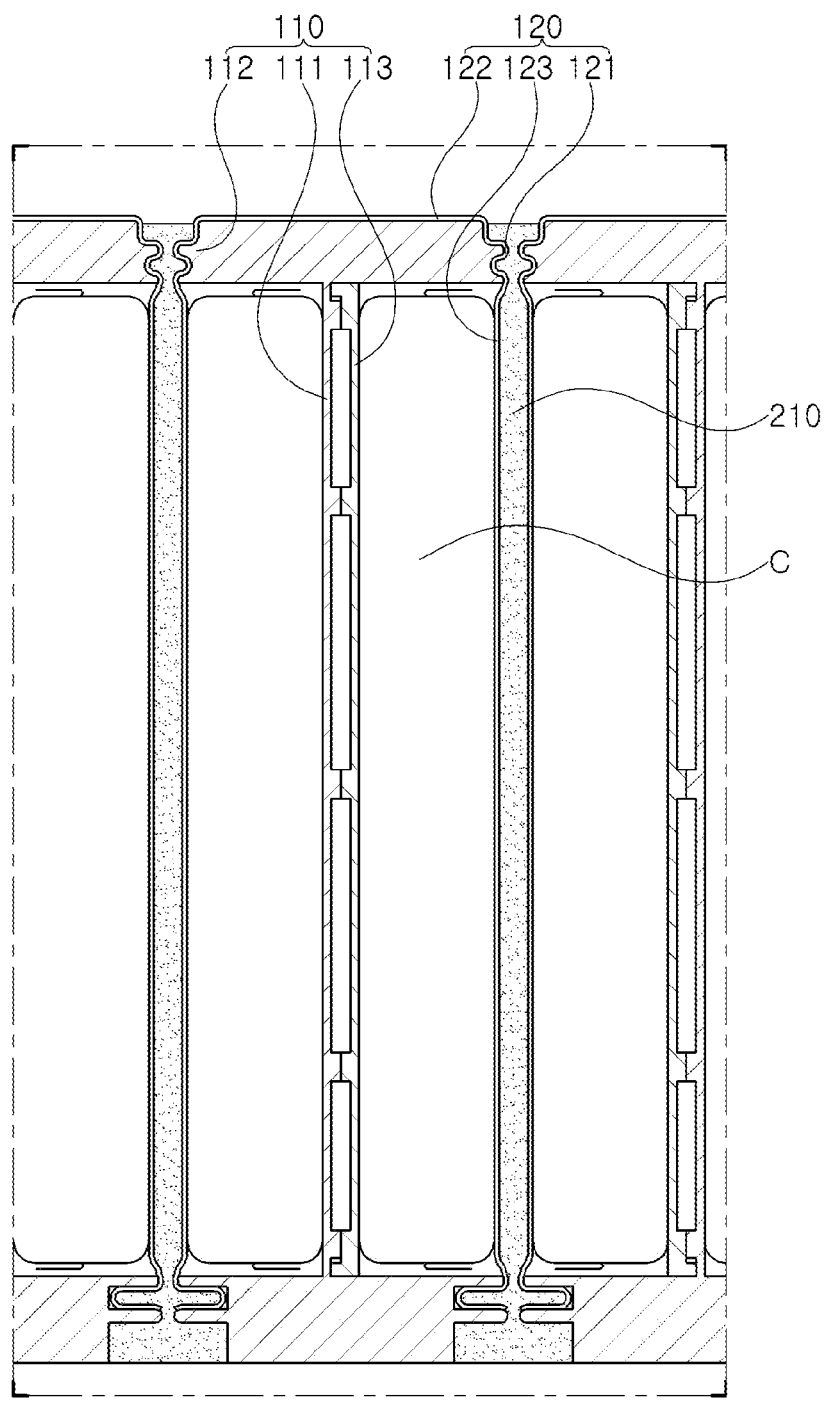
FIGS. 6 to 8 are cross-sectional diagrams illustrating a state in which a case gap forming portion is formed between cell case units in a battery module according to an example embodiment of the present disclosure.
Figure 7:
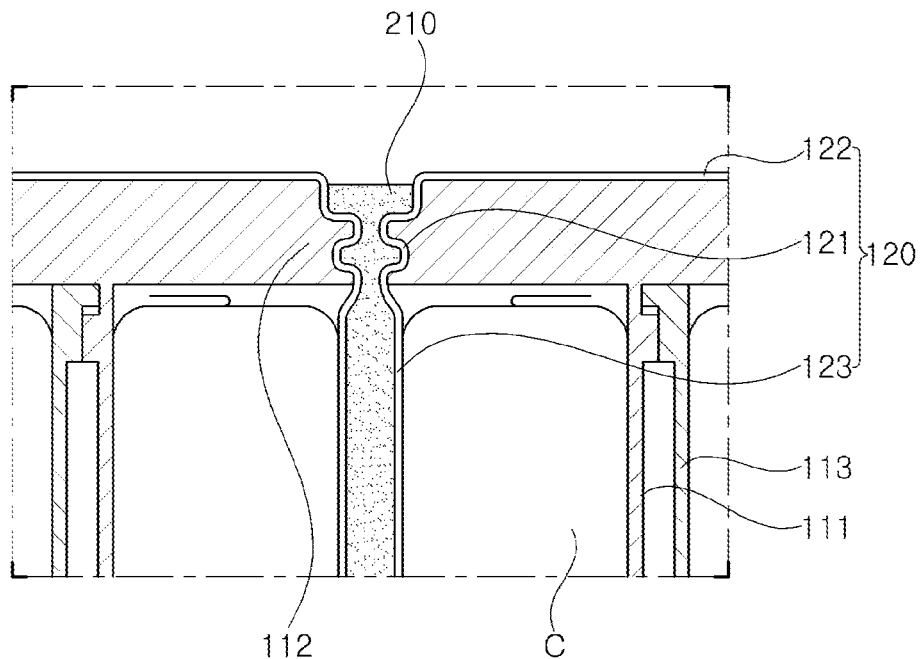
Figure 8:
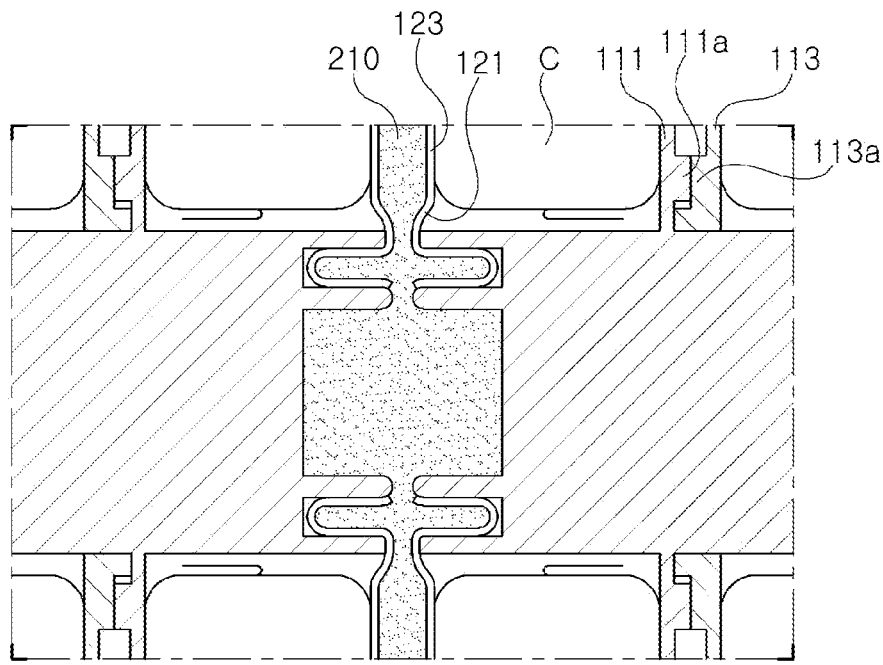

FIG. 5 is a perspective diagram illustrating an example embodiment of a battery module including a case gap forming portion according to an example embodiment. FIGS. 6 to 8 are cross-sectional diagrams illustrating a state in which a case gap forming portion is formed between cell case units in a battery module according to an example embodiment.

FIG. 6 is a diagram illustrating an overall side end of the secondary battery cell C in the example in which a case gap forming portion 210 is formed between the cell case units 100, FIG. 7 is an enlarged diagram illustrating an upper end of the secondary battery cell C, and FIG. 8 is an enlarged diagram illustrating a lower end of the secondary battery cell C.

Referring to the drawings, the body frame member 200 of the battery module according to another example embodiment may include a case gap forming portion 210 disposed between the cell case units 100 neighboring to each other and forming a gap therebetween.

In other words, the battery module in the example embodiment may include the case gap forming portion 210 which may form a gap between the cell case units 100 to prevent heat propagation between the cell case units 100, in addition to the configuration in which the gap is formed between the secondary battery cells C to prevent propagation of heat therebetween.

The case gap forming portion 210 may be configured such that an air gap is formed between the cell case units 100, or may be configured to maintain the gap by including a material for filling the gap.

In an example in which the case gap forming portion 210 forms an air gap, a support portion may be formed on a corner portion and a space may be formed in a central portion, as illustrated in FIG. 5.

An example in which the case gap forming portion 210 includes a material for filling the gap is illustrated in FIGS. 6 to 8. The material for forming the gap of the case gap forming portion 210 may be an insulating material, such as a polymer insulating material, for example. However, an example embodiment thereof is not limited thereto, and a material able to perform insulation between the cell case units 100 neighboring to each other may be used as the filling material of the case gap forming portion 210 in the example embodiment.

According to the aforementioned example embodiment, the cell case unit and the battery module including the same may have an advantage of preventing ignition propagation of secondary battery cells.

Also, the cell case unit and the battery module including the same in the example embodiment have an advantage of preventing explosion of the secondary battery cells caused by swelling of the secondary battery cells.

Further, the battery module in the example embodiment may address the issue in which, when a plurality of secondary battery cells are mounted as in an energy storage system (ESS), an explosion of one of the secondary battery cells may spread to the neighboring secondary battery cells and the secondary battery cells may explode in series.

While the example embodiments have been illustrated and described above, it will be apparent to those skilled in the art that modifications and variations could be made without departing from the scope of the present disclosure as defined by the appended claims.

What is claimed is:

1. A cell case unit, comprising:
   a plurality of secondary battery cells;
   a cell support member including at least one seating portion in which the secondary battery cells are accommodated; and
   a case member covering the secondary battery cells accommodated in the seating portion and coupled to the cell support member,
   wherein the case member includes:
   an end plate portion enclosing one end of the cell support member; and
   a side plate portion enclosing the secondary battery cells accommodated in the seating portion, having one end connected to the end plate portion and an other end coupled to the cell support member.

2. The cell case unit of claim 1, wherein the side plate portion includes a deformation portion on at least one of the one end connected to the end plate portion and the other end coupled to the case member,
   wherein the deformation portion is configured to be deformed when at least one of the plurality of secondary battery cells swells.

3. The cell case unit of claim 2, wherein the deformation portion has a bellows shape.

4. The cell case unit of claim 1, wherein one end of the case member is closed and the other end is open, such that the case member is inserted into and coupled to an upper portion and a lower portion of the cell support member in which the secondary battery cells are accommodated.

5. The cell case unit of claim 1, wherein the case member is formed of iron (Fe) having a thickness of at least 0.65 mm and, or is formed of aluminum (Al) having a thickness of 1.0 mm.

6. The cell case unit of claim 2, wherein the cell support member is formed to have a shape corresponding to a shape of the deformation portion of the case member formed in a zigzag pattern and is coupled to the case member.

7. The cell case unit of claim 1, wherein the cell support member includes a cell gap forming portion coupled to the seating portion and forming a gap between the secondary battery cells.

8. The cell case unit of claim 7, wherein the cell gap forming portion includes a second protruding tab forming a columnar shape together with a first protruding tab formed in the seating portion and forms a space around the first protruding tab and the second protruding tab.

9. The cell case unit of claim 7, wherein the gap is formed to be at least 2 mm wide.

10. A battery module, comprising:
    a cell case unit of claim 1; and
    a body frame member in which a plurality of cell case units are installed.

11. The battery module of claim 10, wherein the body frame member includes a case gap forming portion disposed between the cell case units neighboring to each other and forming a gap therebetween.

* * * * *